(12) United States Patent
Shimizu

(10) Patent No.: US 6,427,013 B1
(45) Date of Patent: Jul. 30, 2002

(54) INFORMATION BROADCASTING METHOD, RECEIVER, AND INFORMATION PROCESSING APPARATUS

(75) Inventor: Kiyoshi Shimizu, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/205,980

(22) Filed: Dec. 4, 1998

(30) Foreign Application Priority Data

Dec. 9, 1997 (JP) .............................................. 9-338995

(51) Int. Cl.[7] .............................................. H04N 7/167
(52) U.S. Cl. ........................ 380/239; 380/211; 380/241
(58) Field of Search ............................... 380/239, 240, 380/241, 211, 231, 232, 227, 229

(56) References Cited

U.S. PATENT DOCUMENTS

| | | | | |
|---|---|---|---|---|
| 4,998,278 A | * | 3/1991 | Sasa ........................... | 380/239 |
| 5,237,610 A | * | 8/1993 | Gammie et al. ............ | 380/228 |
| 5,990,882 A | * | 11/1999 | Heinonen et al. ........... | 725/133 |

FOREIGN PATENT DOCUMENTS

| | | |
|---|---|---|
| EP | 0 618 539 A1 | 10/1994 |
| EP | 0 639 918 A1 | 2/1995 |
| JP | 09212457 | 8/1997 |
| WO | WO 95/01060 | 1/1995 |

* cited by examiner

*Primary Examiner*—Gilberto Barrón
*Assistant Examiner*—Douglas J. Meislahn
(74) *Attorney, Agent, or Firm*—Lerner, David, Littenberg, Krumholz & Mentlik, LLP

(57) ABSTRACT

An information broadcasting method, a receiver, and an information processing apparatus make it possible to secure safety of information transmission between an information center and information. By encrypting confirmation information with a method making it possible to decipher the confirmation information only in the information terminal that becomes its receiver when an information center transmits the contents of the response signal (S30) transmitted from the information terminal (9) to the information center (3, 22) as the confirmation information, it becomes possible to secure safety of information transmission between the information center and information terminal.

24 Claims, 4 Drawing Sheets

INFORMATION BROADCASTING METHOD, RECEIVER, AND INFORMATION PROCESSING APPARATUS

BACKGROUND OF THE INVENTION

1. Field of the Invention

The present invention relates to an information broadcasting method and more particularly, is suitably applied to an information broadcasting method for a digital satellite broadcasting system.

2. Description of the Related Art

This kind of digital satellite broadcasting systems realize multiple channel broadcasting of approximately 100-channel broadcasting by compress-coding multiple channels of program data and by multiplexing and transmitting the compresscoded data in accordance with moving picture experts group (MPEG) 2 method as a compress-coding method for the program data.

Such digital satellite broadcasting systems provide various interactive broadcasting services for viewers by multiplication of channels. Among these interactive broadcasting services, there is a shopping service for enabling viewers to enjoy shopping at their own homes by selecting and purchasing desired goods from goods information displayed on TV screens. In this shopping service by the interactive broadcasting, viewers and providers are connected through ground networks such as telephone networks in mutual directions, that is, in both upward and downward directions. Hence, safety of communication is required to secure.

As what realizes safe communication in interactive broadcasting with using this ground network, IT Vision is considered. In the IT Vision, a center, which is isolated from the internet, is located for connecting the center and viewers, as well as the center and broadcasting station through telephone networks, and the broadcasting station and sellers respectively through private lines. Thereby, viewers, broadcasting station and sellers can respectively communicate with each other.

In addition, as what secures the safety of communication in a ground network using the Internet, secure electronic transaction (SET) is considered. In the SET, masquerade as viewers and tapping are prevented by using cryptography, such as an open key cryptograph system.

In the above-described IT Vision, there is no possibility of hacking from the internet. However, since anyone in the network itself can easily know the telephone number of the access point, which is a node of the viewers and center, he could analyze a protocol with access to its access point. Therefore, the IT Vision has a problem on the safety of communication.

In addition, in the above-described SET, as an authentic station needs to be provided for authenticating each viewer by giving the viewer a user identification (ID)-so as to realize the cryptography, there is a problem that the configuration should be more complicated.

SUMMARY OF THE INVENTION

In view of the foregoing, an object of this invention is to provide an information broadcasting method, in which the safety of information transmission between an information center, and information terminals can be secured.

The foregoing object and other objects of the invention have been achieved by the provision of an information broadcasting method, a receiver and an information processing apparatus.

In the information broadcasting method, an information center executes service processing according to response information by transmitting predetermined-response information based on a program sent from the information center to an information terminal. Wherein, the information center encrypts confirmation information based on the response information with using an encryption method inherent to the information terminal transmitting the response information, and transmits the information to the information terminal. Further, the information terminal receiving the confirmation information deciphers the confirmation information, and judges whether the confirmation information corresponds to the contents of the response information.

Also in the present invention, the mutual direction service system executes mutual direction service processing corresponding to the received response information in the broadcasting station by transmitting predetermined response information from a receiver to the broadcasting station corresponding to a mutual direction service program transmitted from the broadcasting station. Wherein, a receiver is provided. Further, the receiver comprises receiving means for receiving a confirmation information corresponding to the response information transmitted after encryption from the broadcasting station, detachable storing means for storing receiver identification information, and deciphering means for deciphering codes of the received confirmation information with using the received identification information stored in the storing means.

Further, in the present invention, the information processing apparatus in the broadcasting station for receiving predetermined response information according to the mutual direction service program from the receiver, and for executing mutual direction service processing according to the received response information comprises storing means for storing encryption information corresponding to each plurality of receiver identification information, reading means for reading encryption information corresponding to-the receiver identification information contained in the received response information, encryption means for encrypting confirmation information based on the read encryption information, and transmitting means for transmitting encrypted confirmation information to the receiver transmitting the response information.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) First Embodiment

Figure 1:
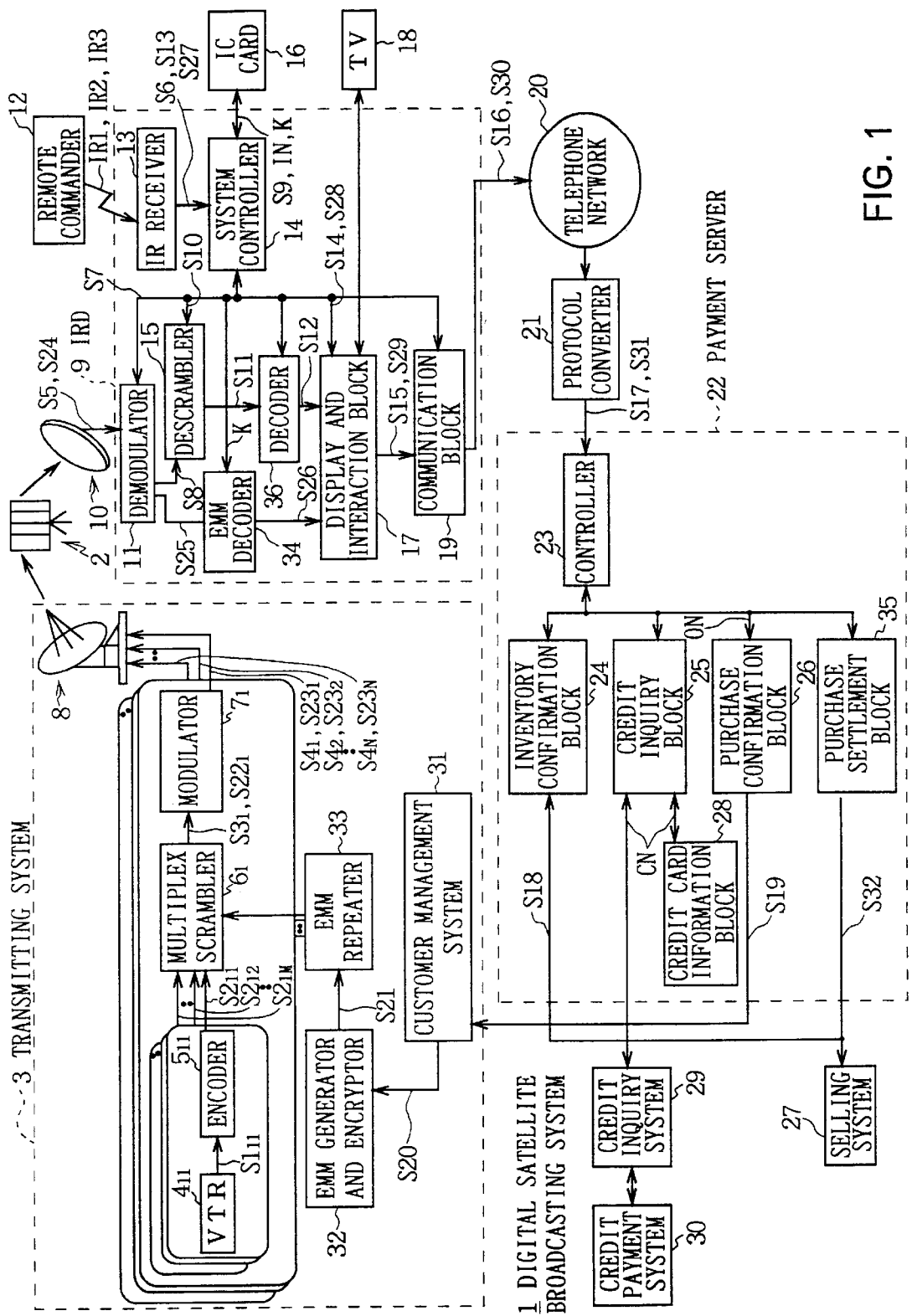
FIG. 1 is a block diagram showing the configuration of a digital satellite broadcasting system according to a first embodiment of the present invention.

In FIG. 1, symbol 1 generally shows a digital satellite broadcasting system according to a first embodiment. A transmitting system 3 of a broadcasting station transmitting multiple channels of broadcasting waves to a communication satellite 2, reproduces a channel of program data $S1_{11}$ which is recorded in a video tape recorder (VTR) $4_{11}$, and outputs the data $S1_{11}$ to an encoder $5_{11}$. The encoder $5_{11}$, performs compressive encoding on the program data $S1_{11}$ by the MPEG 2 method, and outputs obtained encoded data $S2_{11}$, to a multiplex scrambler $6_{11}$.

In the same way, encoded data $S2_{12}$–$S2_{1M}$, which are respectively obtained by compressive encoding a predetermined number of program data among plural channels of program data, are inputted respectively to the multiplex scrambler $6_1$. The multiplex scrambler $6_1$ generates a bit stream by performing time division multiplex processing on these encoded data $S2_{12}$–$S2_{1M}$, and scrambles the stream so as to output multiplex data S31, which is obtained as its result, to a modulator $7_1$.

The modulator $7_1$ digitally modulates the multiplex data $S3_1$ based on a predetermined modulation system, and supplies a resulted transmission signal $S4_1$ to a parabola antenna 8. In the same way, transmission signals $S4_2$–$S4_N$ which are generated by multiplexing a predetermined number of codes after performing respectively compressive encoding on program data of the rest of the channels, are also supplied to the parabola antenna 8 respectively.

Thereby, electric waves corresponding to the transmission signals $S4_1$–$S4_N$ are emitted from the parabola antenna 8 toward the communication satellite 2, and are transmitted to an intelligent receiver and decoder (IRD) 9 in a house of a viewer via transponders (not shown) provided in the communication satellite 2 at the transmission channel corresponding to the number of transponders.

The IRD 9 inputs a reception signal S5, which is received by a parabola antenna 10, to a demodulator 11. By the way, in the IRD 9, when the viewers operates an operation key of a remote commander 12, an infrared signal IR1 is outputted from the remote commander 12. Further, an infrared radiation (IR) receiver 13 receives this infrared signal IR1 in order to output an infrared reception signal S6, which is the result of receiving the infrared signal, to a system controller 14.

The system controller 14 controls the entire system, and generates a control signal S7 from the infrared reception the signal S6 in order to output the signal S6 to the demodulator 11. The demodulator 11 selects a desired transmission channel among the reception signals S5 based on the control signal S7, and generates multiplex data by digitally demodulating the signal S7 according to a predetermined demodulation system. Furthermore, the demodulator 11 extracts encoded data S8 of a desired channel instructed by the viewers, among this multiplex data, and outputs this to a descrambler 15.

By the way, an integrated circuit (IC) card 16 has key data for canceling scramble. The system controller 14 reads the key data S9 from the IC card 16, generates a scramble-canceling signal S10 based on the key data S9, and outputs the signal S10 to the descrambler 15. The descrambler 15 cancels the scramble on the encoded data S8 based on the supplied scramble-canceling signal S10, and outputs encoded data S11 obtained as its result, to a decoder 36.

The decoder 36 performs decompression decoding on the encoded data S11, and outputs obtained program data S12 to a display and interaction block 17. The display and interaction block 17 displays images, corresponding to the program data S12, on a television (TV) screen by outputting this program data S12 to a TV set 18. In this manner, by selecting a channel broadcasting a shopping service program with the remote commander 12, viewers can view/listen to the program for shopping. That is, this enables viewers to obtain the state of shopping at home.

In this state, if the viewer selects the desired goods from goods information displayed on the TV screen, an infrared signal IR2 corresponding to contents of the instruction is outputted from the remote commander 12. The IR receiver 13 receives this infrared signal IR2, and outputs the obtained infrared reception signal S13, to the system controller 14. The system controller 14 generates a goods selection signal S14 from the infrared reception signal S13, and outputs this to the display and interaction block 17.

The display and interaction block 17 generates order information such as an identification number attached to the goods to be ordered (hereinafter, this is called a goods ID number), and quantity, based on the supplied goods selection signal 514. By the way, the IC card 16 has a peculiar IC card number. Then, the display and interaction block 17 reads the IC card number IN from the IC card 16 through the system controller 14. Then, the block 17 generates a goods purchase signal 515, which is obtained by pairing the IC card number IN and the generated order information, and outputs this to a communication block 19. The communication block 19 modulates this goods purchase signal S15 with a predetermined modulation system, and outputs a goods purchase signal 516, which is obtained as its result, to a protocol converter 21 through the telephone network 20.

The protocol converter 21 converts the goods purchase signal S16 into the internet protocol, and outputs an obtained goods purchase signal S17 to a controller 23 of a payment server 22. This controller 23 is made to control the entire system of the payment server 22, and outputs the supplied goods purchase signal S17 to an inventory confirmation block 24, a credit inquiry block 25, and purchase confirmation block 26. The inventory confirmation block 24 generates an inventory confirmation signal 919 from the goods purchase signal S17, and confirms inventory of the goods, which is ordered, by giving the signal S18 to a selling system 27.

The credit inquiry block 25 inquires viewer's/audience's credit corresponding to a credit card number CN by accessing to a credit card information block 28 based on the IC card number which is shown by the goods purchase signal S17 supplied from the controller 23, and by reading the credit card number CN corresponding to the IC card number, and by giving this to a credit payment system 30 through a credit inquiry system 29.

When the goods purchase signal S17 is supplied from the controller 23, the purchase confirmation block 26 generates only a number for identifying the order (hereinafter, this is called an order ID number) so as to be stored in a memory. At the same time, the purchase confirmation block 26 generates a message for confirming viewer's purchase intention (hereinafter, this is called a confirmation request message) in order to output these order ID number and confirmation request message, together with order information and IC card number contained in the goods purchase signal S17, as a confirmation information signal S19, to a customer management system 31 in the transmitting system 3.

The customer management system 31 stores encryption keys, which are different every IC card number, respectively in a memory. After reading an encryption key corresponding to the IC card number of the confirmation information signal S19 supplied from the memory, the system 31 outputs the encryption key, order ID number, order information, and confirmation request message which are contained in the confirmation information signal S19, as an encrypted information signal S20 to an entitlement management message (EMM) generator and encryptor 32.

The EMM generator and encryptor 32 generate an EMM message S21 based on the supplied encrypted information signal S20 by encrypting the order ID number, order information, and confirmation request message with using the encryption key corresponding to the IC card number, and output the message S21 to an EMM repeater 33. Thereby, the EMM generator and encryptor 32 can generate the EMM message S21 that can be deciphered only by the IC card 16 corresponding to the IC card number, and prevent from tampering and fabrication of order information, and masquerade as a viewer. The EMM repeater 33 is for transmitting repeatedly the EMM message S21 during a certain period of time. Hence, the EMM repeater 33 repeatedly outputs the EMM message S21 to the multiplex scramblers $6_1$–$6_N$ respectively.

The multiplex scramblers $6_1$ generates a bit stream by performing time division multiplex processing on the encoded data $S2_{11}$–$S2_{1M}$ and EMM message S21, as well as scrambles the bit stream in order to output obtained multiplexed-data $S22_1$ to a modulator $7_1$. The modulator $7_1$ digitally modulates the multiplexed-data $S22_1$ based on a predetermined modulation system, and supplies an obtained transmission signal $S23_1$ to the parabola antenna 8. Transmission signals $S23_2$–$S23_N$, which are obtained in the same way, are also supplied respectively to the parabola antenna 8.

Thus, electric waves corresponding to the transmission signals $S23_1$–$S23_N$ are emitted from the parabola antenna 8 toward the communication satellite 2 respectively, and are transmitted to the IRD 9 in transmission channels according to the number of transponders through the transponders provided in the communication satellite 2.

The IRD 9 inputs a reception signal S24, received by the parabola antenna 10, to a demodulator 11. The demodulator 11 selects a desired transmission channel in the reception signal S24, based on the control signal S7 supplied from the system controller 14. Further, the demodulator 11 digitally demodulates the signal, and thereafter extracts the EMM message S25 corresponding to the channel, which is viewed, to output this to an EMM decoder 34.

By the way, the IC card 16 stores a decoding key corresponding to the IC card number, that is, a decoding key corresponding to the encryption key when generating the EMM message S21 in the transmission system 3, in a memory. The system controller 14 reads the decoding key K corresponding to the IC card number of the IC card 16 from the IC card 16, and supplies the decoding key K to the EMM decoder 34.

The EMM decoder 34 decodes the EMM message S25 with using the decoding key K supplied from the system controller 14, and outputs an obtained message S26 to the display and interaction block 17. In this manner, as the EMM message S25 can be decoded only with the decoding key K corresponding to the IC card number, tampering and fabrication of order information and masquerade as a viewers can be prevented from. The display and interaction block 17 displays the confirmation request message according to the message S26 on the TV screen by outputting the message S26 to the TV set 18.

In this state, the viewers visually confirms the confirmation request message displayed on the TV screen. If this confirmation request message is correct, he/she performs instruction of purchase confirmation with the remote commander 12. The IR receiver 13 receives an infrared signal IR3 according to contents of the instruction supplied from the remote commander 12, and outputs an infrared reception signal S27 to the system controller 14. The system controller 14 generates a confirmation instruction signal B28 from this infrared reception signal S27, and outputs signal S28 to the display and interaction block 17.

The display and interaction block 17 outputs the order ID number and order information in the message S26, and the IC card number IN, which is read from the IC card 16 through the system controller 14, as an order confirmation signal S29 to the communication block 19. The communication block 19 generates an order confirmation signal S30 by modulating this order confirmation signal S29 with predetermined modulation system, and outputs S30 to the protocol converter 21 through the telephone network 20.

The protocol converter 21 converts the order confirmation signal S30 into the internet protocol, and outputs an obtained order confirmation signal S31 to a purchase settlement block 35 through the controller 23 of the payment server 22. The purchase settlement block 35 can compare the order ID number ON when ordering with the order ID number at the timing of purchase confirmation by reading the order ID number ON stored in a memory in the purchase confirmation block 26, through the controller 23, and by confirming whether the order ID number ON coincides with the order ID number of the order confirmation signal S31. Hence, the masquerade as a viewer can be prevented. If they coincide with each other, the purchase settlement block 35 not only mak+++es arrangement for goods delivery by generating a purchase settlement signal S32 from the order confirmation signal S31 and by outputting S31 to the selling system 27, and records the contents of preparation in a transaction (not shown) to perform processing on reservation of inventory, actual goods delivery, recovery of the charge, and the like thereafter.

Figure 2:
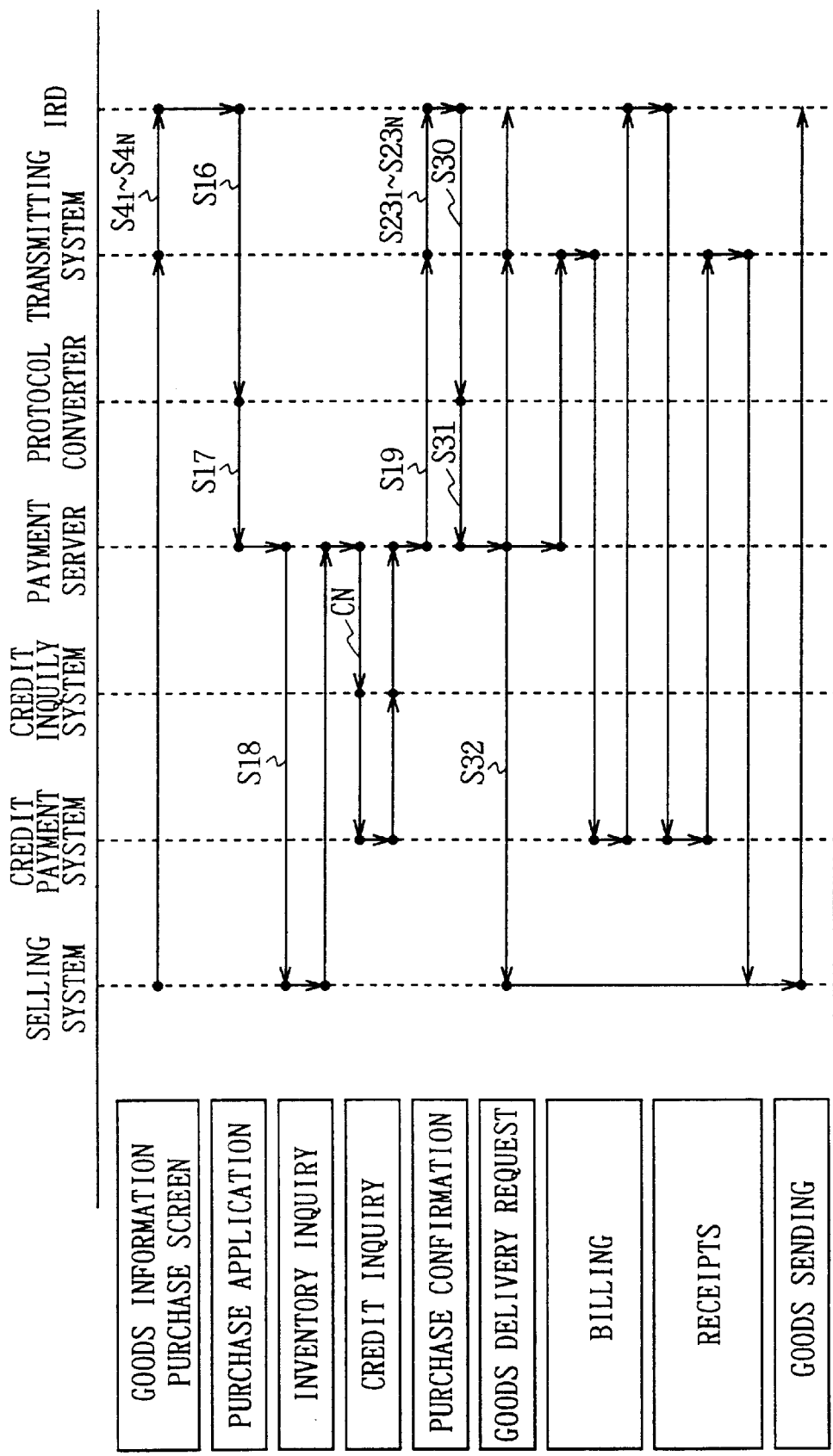
FIG. 2 is a schematic diagram showing a procedure of goods purchase processing according to the first embodiment.

Procedure of goods purchase processing in the above-described configuration will be described with reference to FIG. 2. The selling system 27 produces a shopping service program, which is broadcast, and records the program in a desired VTR4 among VTRs $4_{11}$–$4_{NM}$ of the transmission system 3 as program data. The transmission system 3 generates transmission signals $S4_1$–$S4_N$ by performing predetermined data processing on program data reproduced from the VTRs $4_{11}$–$4_{NM}$. Thereafter, the selling system 27 emits electric waves corresponding to the transmission signals $S4_1$–$S4_N$ to the communication satellite 2 in order to transmit the transmission signals $S4_1$–$S4_N$ to the IRD 9 through the transponders of the communication satellite 2.

In the IRD 9, when the viewers selects a channel providing a shopping service, he/she can view/listen to the shopping service program with images of the program being displayed on the TV screen. In this state, in the IRD 9, when the viewers selects desired goods from the goods information displayed on the TV screen, the goods purchase signal S16 composed of its order information and the IC card number of the IC card 16 is outputted to the protocol converter 21.

The protocol converter 21 converts the goods purchase signal S16 into the internet protocol, and outputs an obtained goods to the payment server 22. The payment server 22 generates an inventory confirmation signal S18 from the goods purchase signal S17, and confirms the inventory of the goods to be ordered, by giving S18 to the selling system 27.

In addition, the payment server 22 inquires the viewer's credit corresponding to the credit card number CN by detecting the IC card number from the goods purchase signal S17 and by supplying the credit card number CN corresponding to the IC card number with the credit payment system 30 through the credit inquiry system 29.

Successively, the payment server 22 generates the order ID number and confirmation request message, and outputs these order ID number and confirmation request message together with the order information and IC card number in the goods purchase signal S17, to the transmission system 3 as a confirmation information signal S19.

The transmission system 3 generates the EMM message S21 by encrypting the order ID number, order information, and confirmation request message based on the supplied confirmation information signal S19, with using the encryption key corresponding to the IC card number. Subsequently, the transmission system 3 generates transmission signals $S23_1$–$S23_N$ by performing digital modulation after multiplexing the EMM message S21 with the program data, and transmits electric waves according to these transmission signals $S23_1$–$S23_N$ to the IRD 9.

The IRD 9 generates a message S26 by decoding the EMM message S25 in the reception signal S24 with using the decoding key K corresponding to the IC card number, and displays a confirmation request message according to the message S26 on the TV screen. In this state, when the viewers instructs purchase confirmation, the IRD 9 generates an order confirmation signal S30 composed of the order ID number, order information, and IC card number, and outputs S30 to the protocol converter 21 through the telephone network 20.

The protocol converter 21 converts the order confirmation signal S30 into the Internet protocol, and outputs an obtained order confirmation signal S31, to the payment server 22. The payment server 22 makes preparation for goods delivery by generating a purchase settlement signal S32 from the order confirmation signal S31 and supplying S32 to the selling system 27. In addition, the payment server 22 generates a message showing completion of preparation for goods (hereinafter, this is called a goods preparation message), and outputs the message with the IC card number to the transmission system 3.

The transmission system 3 generates a goods preparation encrypted-message by encrypting the goods preparation message with using the encryption key corresponding to the IC card number. Subsequently, the transmission system 3 generates transmission signals according to the number of transponders by performing digital modulation after the transmission system 3 multiplexing this goods preparation encrypted-message with program data, and transmitting these transmission signals to the IRD 9.

The IRD 9 informs the viewers of completion of goods preparation by generating a goods preparation message by decoding the received preparation encrypted-message, with using the decoding key K corresponding to the IC card number and displaying a message according to the goods preparation message on the TV screen.

Furthermore, the payment server 22 calculates the purchase charge of the goods by reading the contents of goods preparation that is recorded in the transaction, and informs the transmission system 3 of this. The transmission system 3 informs the credit payment system 30 of the charge that is obtained by adding a TV view/listening charge to this goods purchase charge. Receiving this, the credit payment system 30 demands the total charge of these goods purchase charge and TV view/listening charge of the viewers. The viewer pays the goods purchase charge and TV view/listening charge to the credit payment system 30. The credit payment system 30 pays the goods purchase charge and TV view/listening charge, which is paid, to the transmission system 3. The transmission system 3 pays the goods purchase charge to the selling system 27 after recovering only the TV view/listening charge from this. The selling system 27 recovers the goods purchase charge, and sends out the goods to the viewers.

According to the above configuration, the order information and confirmation request message, which are transmitted from the transmission system 3 to the IRD 9 through the communication satellite 2 are encrypted in order to be decoded only by a specific IC card 16. Thereby, performing masquerade and tapping by a invader can be prevented by identifying the viewer with an existing IC card 16. Hence, the safety of communication in simple configuration can be secured.

(2) Second Embodiment

Figure 3:
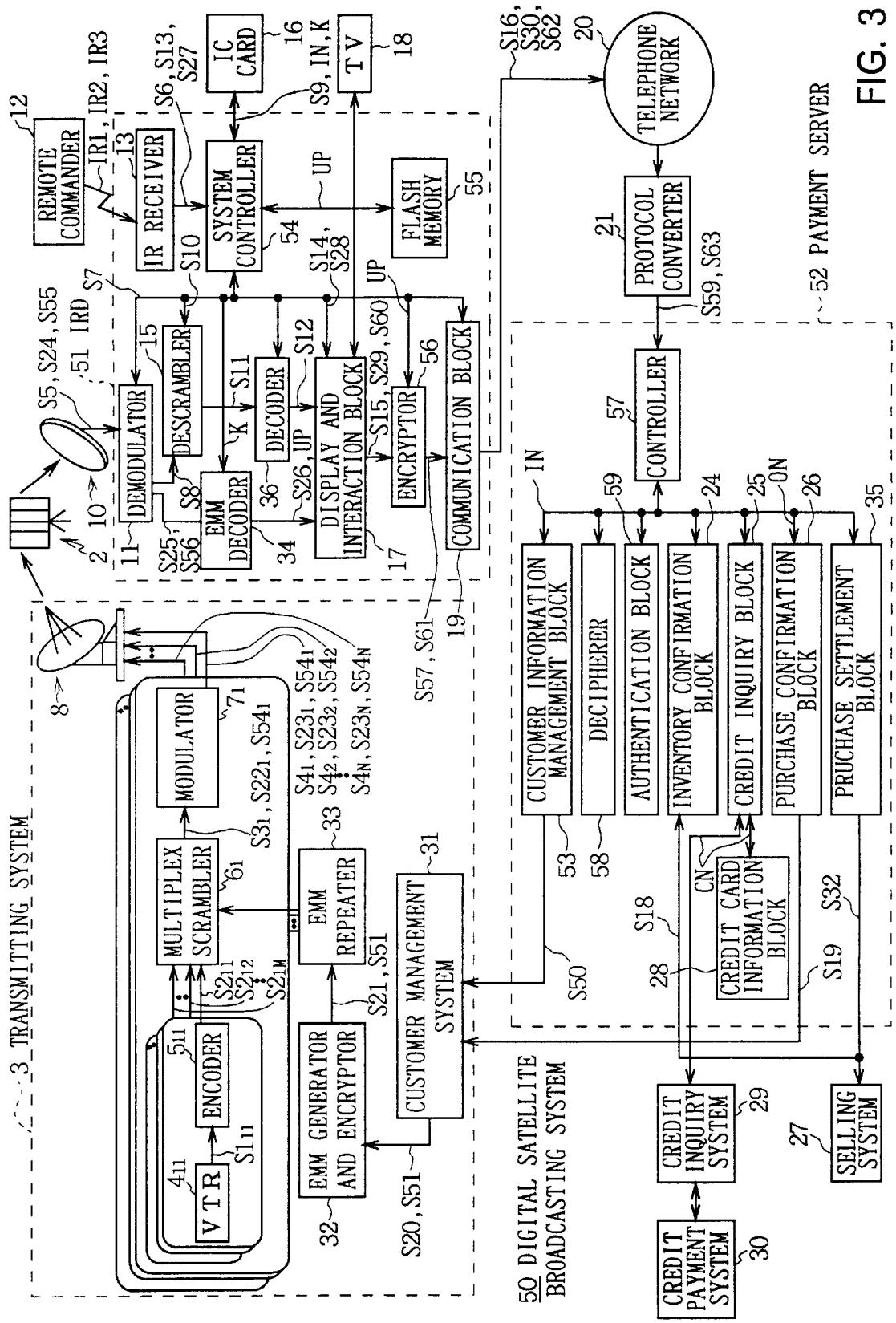
FIG. 3 is a block diagram showing the configuration of a digital satellite broadcasting system according to a second embodiment.

In FIG. 3 where the same symbols are assigned to the same parts as in FIG. 1, symbol 50 generally shows a digital satellite broadcasting system according to a second embodiment. The broadcasting system according to the second embodiment has the same configuration as the digital satellite broadcasting system 1 according to the first embodiment, except for the configuration of an IRD 51 and a payment server 52.

In this case, a viewers should make a contract of enabling her/him to view/listen to a channel broadcasting a shopping service beforehand (hereinafter, this is called a viewer's registration). When such viewer's registration is applied, the customer information management block 53 of the payment server 52 issues a user ID/password corresponding to this viewers, and registers this user ID/password and an IC card number of an IC card, which this viewers possesses, as a pair. Furthermore, the customer information management block 53 outputs these user ID/password and IC card number corresponding to the user ID/password to the customer management system 31 in the transmission system 3 as a viewers registration signal S50.

The customer management system 31 reads an encryption key corresponding to the IC card number of the viewers registration signal S50 from its internal memory, and outputs this encryption key and the user ID/password to the EMM generator and encryptor 32 as a viewers registration signal S51. The EMM generator and encryptor 32 encrypts the user ID/password from the viewers registration signal S51, which is supplied, with the encryption key, and outputs a viewers registration encrypted-message S52, which is obtained as its result, to the EMM repeater 33. The EMM repeater 33 repeatedly outputs the viewers registration encrypted-message S52 to the multiplex scramblers $6_1$–$6_N$ respectively.

The multiplex scramblers $6_1$ not only performs time division multiplex processing on the encoded data $S2_{11}$–$S2_{1M}$ and viewer's registration encrypted-message S52, but also scrambles them to output obtained multiplexed-data $S53_1$, to a modulator $7_1$. The modulator $7_1$ digitally modulates the multiplexed data $S53_1$, and supplies an obtained transmission signal $S54_1$ to the parabola antenna 8. Transmission signals $S54_2$–$S54_N$ generated in the same way are also supplied respectively to the parabola antenna 8. Owing to this, electric waves corresponding to the transmission signals $S54_1$–$S54_N$ are emitted from the parabola antenna 8 toward the communication satellite 2 respectively, and are transmitted to the IRD 51 through the transponders provided in the communication satellite 2.

The IRD 51 inputs a reception signal S55, which is received by the parabola antenna 10, to a demodulator 11. The demodulator 11 extracts a viewers registration encrypted-message S56 by performing predetermined data processing to the reception signal S55, which is received, based on the control signal S7 supplied from the system controller 54, and outputs this to the EMM decoder 34.

The EMM decoder 34 decodes the viewers registration encrypted-message S56 with using the decoding key K supplied through the system controller 54, and outputs the obtained user ID/password UP to the display and interaction block 17. The system controller 54 reads the user ID/password UP from the display and interaction block 17 and stores it in flash memory 55. Owing to this, viewer's registration is completed.

Subsequently, a case that a viewer performs shopping with viewing a shopping service program will be described. In the IRD 51, when the viewers selects the desired goods, from goods information displayed on a TV screen, with watching the shopping service program, the display and interaction block 17 generates its order information based on the goods selection signal S14 supplied from the system controller 54. At the same time, the display and interaction block 17 reads the IC card number IN from the IC card 16 through the system controller 54 in order to output the goods purchase signal S15 composed of these order information and IC card number to the encryptor 56.

The encryptor 56 reads the user ID/password UP from the flash memory 55 through the system controller 54. Thereafter, the encryptor 56 encrypts the user ID/password UP and the order information with the using IC card number so as to output the encrypted one and the user ID to the communication block 19 as a goods purchase encrypted-signal S57. The communication block 19 modulates the goods purchase encrypted-signal S57 with a predetermined modulation system, and outputs an obtained goods purchase encrypted-signal S58 to the protocol converter 21 through the telephone network 20.

The protocol converter 21 converts the goods purchase encrypted-signal S58 into the Internet protocol, and outputs an obtained goods purchase encrypted-signal S59 to a controller 57 of the payment server 52. The controller 57 controls the entire payment server 52, and outputs the supplied goods purchase encrypted-signal S59 to a customer information management block 53, a decipherer 58, an authentication block 59, the inventory confirmation block 24, credit inquiry block 25 and purchase confirmation block 26.

The customer information management block 53 searches an IC card number corresponding to the user ID with using the user ID of the goods purchase encrypted-signal S59 as a key, and outputs IC card number to the decipherer 58 through the controller 57. The decipherer 58 obtains the user ID/password and order information by deciphering a part, which is included in the goods purchase encrypted-signal S59 and is encrypted, with the supplied IC card number.

The authentication block 59 confirms whether the user ID/password, which is deciphered by the decipherer 58, coincides with the user ID/password, which is registered in the customer information management block 53. If a coincidence is confirmed, the inventory confirmation block 24 generates an inventory confirmation signal S18 from the order information, and confirms the ordered inventory of the goods by giving S18 to the selling system 27.

The purchase confirmation block 26 generates an order ID number and stores it in a memory and also generates a confirmation request message. Then, the block 26 outputs the order ID number and confirmation request message together with the IC card number corresponding to the order information and user ID, as a confirmation information signal S19 to the customer management system 31 in the transmission system 3.

The transmission system 3 generates an EMM message S21 by encrypting the order ID number, order information, and confirmation request message with using the encryption key corresponding to the IC card number based on the confirmation information signal S19. Subsequently, the transmission system 3 generates transmission signals $S23_1$–$S23_N$ by performing digital modulation after the transmission system 3 multiplexes this EMM message S21 with program data, and transmits electric waves according to these transmission signals $S23_1$–$S23_N$ to the IRD 51.

The IRD 51 generates the message S26 by decoding the EMM message S25 in the reception signal S24, which is received, with using the decoding key K corresponding to the IC card number, and displays a confirmation request message according to the message S26 on the TV screen. In the IRD 51, when the viewers instructs purchase confirmation, the display and interaction block 17 generate an order confirmation signal S60 which comprises information showing confirmation of order contents (hereinafter, this is called order confirmation information), the order ID number, order information, and IC card number, and outputs order confirmation signal S60 to the encryptor 56.

When the order confirmation signal S60 is supplied, the encryptor 56 reads the user ID/password UP from the flash memory 55 through the system controller 54. Then, the encryptor 56 encrypts the user ID/password, order confirmation information, order ID number, and order information with the IC card number, and outputs the encrypted one and the user ID as an order confirmation encrypted-signal S61 to the communication block 19. The communication block 19 modulates the order confirmation encrypted-signal S61 with a predetermined modulation system, and outputs an order confirmation encrypted-signal S62, which is obtained as its result, to the protocol converter 21 through the telephone network 20.

The protocol converter 21 converts the order confirmation encrypted-signal S62 into the internet protocol, and outputs an order confirmation encrypted-signal S63, which is obtained as its result, to a controller 57 of the payment server 52. This controller 57 outputs the order confirmation encrypted-signal S63, which is supplied, to the customer information management block 53, decipherer 58, authentication block 59, credit inquiry block 25 and purchase settlement block 35.

The customer information management block 53 searches an IC card number corresponding to the user ID with using the user ID of the order confirmation encrypted-signal S63 as a key, and outputs this to the decipherer 58 through the controller 57. The decipherer 58 obtains the user ID/password, order ID number, and order information by deciphering a part, which is included in the order confirmation encrypted-signal S63 and is encrypted, with the supplied IC card number.

The authentication block 59 confirms whether the user ID/password deciphered by the decipherer 58, coincides with the user ID/password, which is registered in the customer information management block 53. If a coincidence is confirmed, the credit inquiry block 25 reads the IC card number IN corresponding to the user ID/password from the customer information management block 53. Then, the credit card number CN corresponding to the IC card number IN is read by accessing to the credit card information block 28. Thereby, the credit inquiry block 25 inquires the viewer's credit corresponding to the credit card number CN, and giving this to the credit payment system 30 through the credit inquiry system 29.

After that, the purchase settlement block 35 reads the order ID number ON, which is stored in the memory in the purchase confirmation block 26, through the controller 57. Further, the purchase settlement block 35 confirms whether the order ID number ON at the time of ordering and the order ID number at the time of purchase confirmation coinciding with each other. If they coincide, the purchase settlement block 35 makes preparation for goods delivery by generating a purchase settlement signal S32 and outputting this to the selling system 27. At the same time, the purchase settlement block 35 also records the contents of preparation in the transaction to perform thereafter reservation of the inventory, actual goods delivery, recovery of the charges, and the like.

Figure 4:
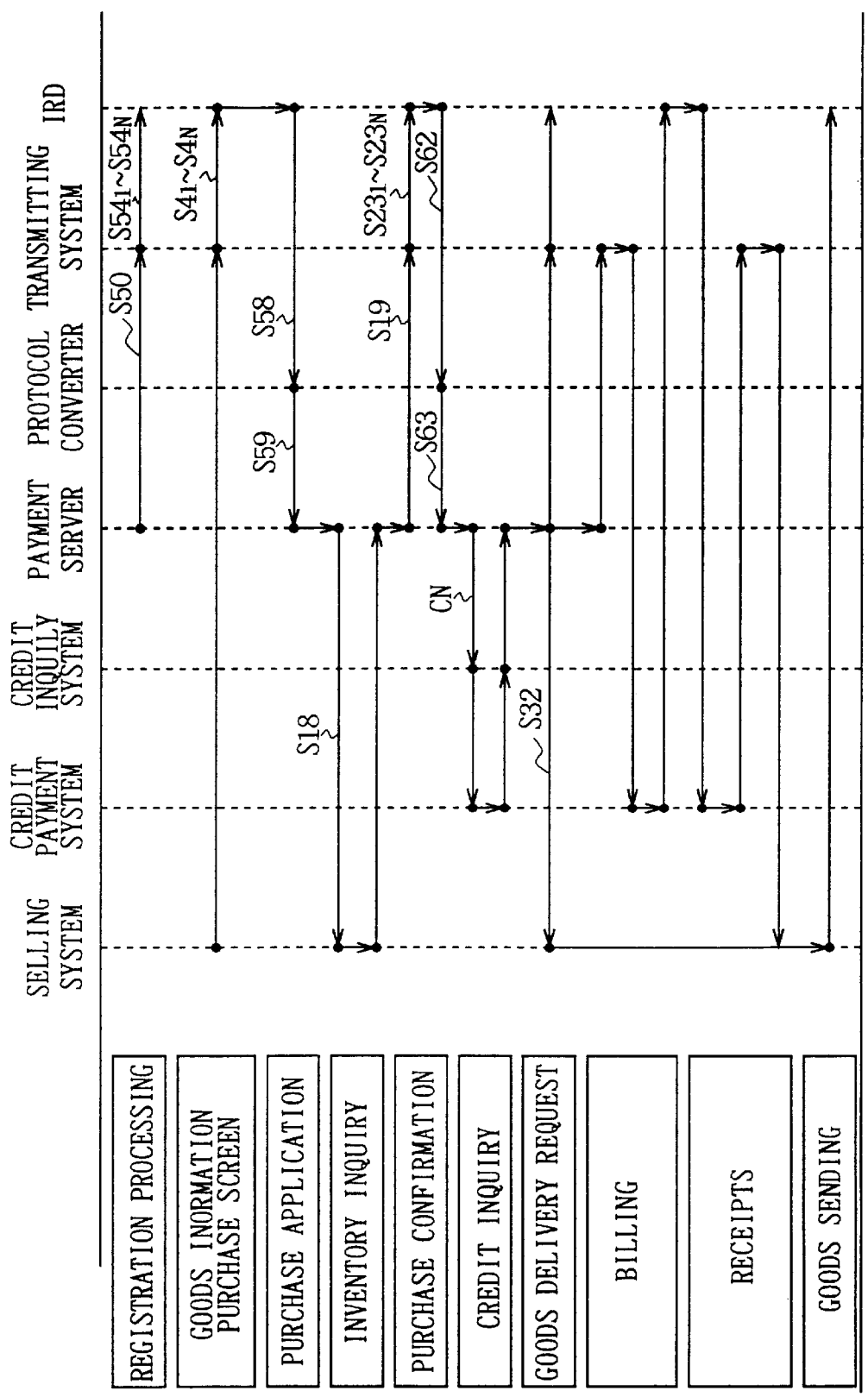
FIG. 4 is a schematic diagram showing a procedure of goods purchase processing according to the second embodiment.

Here, a procedure of goods purchase processing according to above configuration will be described with reference to FIG. 4 showing the corresponding parts assigned to the same symbols as in FIG. 2. When viewer's registration are made, the payment server 52 generates a user ID/password corresponding to the applying viewer, and outputs the user ID/password and the IC card number of the IC card 16, which the viewers possesses, to the transmission system 3 as a viewers registration signal S50.

The transmission system 3 generates a viewers registration encrypted-message S52 by encrypting the user ID/password with an encryption key corresponding to the IC card number based on the viewers registration signal S50. Subsequently, the transmission system 3 generates transmission signals S$54_1$–S$54_N$ by performing digital modulation after multiplexing this viewers registration encrypted-message S52 with the program data, and transmits electric waves corresponding to these transmission signals S$54_1$–S$54_N$ to the IRD 51.

The IRD 51 decodes the viewers registration encrypted-message S56 in the reception signal S55, which is received, with the decoding key K corresponding to the IC card number, and stores the user ID/password, which is obtained as its result, in the flash memory 55.

By the way, the selling system 27 produces a shopping service program, which is broadcast, and records this in a desired VTR4 among VTRs $4_{11}$–$4_{NM}$ of the transmission system 3 as program data. The transmission system 3 generates transmission signals S$4_1$–S$4_N$ by performing pre-determined data processing on program data played back from the VTRs $4_{11}$–$4_{NM}$, and thereafter emits electric waves corresponding to these transmission signals S$4_1$–S$4_N$ toward the communication satellite 2 to transmit them to the IRD 51 through the transponders of the communication satellite 2.

In the IRD 51, when the viewers selects the shopping service program, the viewers can view/listen to the shopping service program by displaying images of the program on the TV screen. In this state, when the viewers selects desired goods in the goods information displayed on the TV screen, the IRD 51 encrypts the order information and the user ID/password with the IC card number. Then, the encrypted order information and the user ID are outputted as a goods purchase encrypted-signal S58 to the protocol converter 21.

The protocol converter 21 converts the goods purchase encrypted-signal S58 into the internet protocol, and outputs a goods purchase encrypted-signal S59, which is obtained as its result, to the payment server 52. The payment server 52 obtains the user ID/password and order information by deciphering a part, which is included in the goods purchase encrypted-signal S59 and is encrypted, with the IC card number corresponding to the user ID. Then, the payment server 52 generates the inventory confirmation signal S18 from the order information, and confirms the ordered inventory of the goods by giving S18 to the selling system 27.

Subsequently, the payment server 52 generates the order ID number and stores it in a memory, and also generates a confirmation request message. Then, the order ID number and confirmation request message are outputted together with the order information and IC card number, to the transmission system 3 as a confirmation information signal S19.

The transmission system 3 generates the EMM message S21 by encrypting the order ID number, order information, and confirmation request message based on the confirmation information signal S19, which is supplied, with using the encryption key corresponding to the IC card number. Subsequently, the transmission system 3 generates transmission signals S$23_1$–S$23_N$ by performing digital modulation after multiplexing this EMM message S21 with the program data, and transmits electric waves according to these transmission signals S$23_1$–S$23_N$ to the IRD 51.

The IRD 51 generates the message S26 by decoding the EMM message S25 in the reception signal S24, which is received, with using the decoding key K corresponding to the IC card number, and displays a confirmation request message according to the message S26 on the TV screen. In this state, when the viewer instructs purchase confirmation, the IRD 51 encrypts the user ID/password, order confirmation information, order ID number, and order information by the IC card number. Then, the encrypted ones and the user ID are outputted as an order confirmation encrypted-signal S62 to the protocol converter 21 through the telephone network 20. The protocol converter 21 converts the order confirmation encrypted-signal S62 into the internet protocol, and outputs an order confirmation encrypted-signal S63, which is obtained as its result, to the payment server 52.

The payment server 52 obtains the user ID/password, order ID number, and order information by deciphering the part, which is included in the goods purchase encrypted-signal S63 and is encrypted, with the IC card number corresponding to the user ID. Furthermore, the payment server 52 inquires the viewer's/audience's credit by supplying the credit card number CN corresponding to the user ID/password to the credit payment system 30 through the credit inquiry system 29.

Subsequently, the payment server 52 makes preparation for goods delivery by generating a purchase settlement signal S32 and supplying S32 to the selling system 27. In addition, the payment server 52 generates a goods preparation message, and outputs this with the IC card number to the transmission system 3.

The transmission system 3 generates a goods preparation encrypted-message by encrypting the goods preparation message with using the encryption key corresponding to the IC card number. Subsequently, the transmission system 3 generates transmission signals according to the number of transponders by performing digital modulation after the transmission system 3 multiplexes this goods preparation encrypted-message with the program data, and transmits these transmission signals to the IRD 51.

The IRD 51 informs the viewers of completion of goods preparation by generating the goods preparation message by decoding the received goods preparation encrypted-message with using the decoding key K corresponding to the IC card number I and displaying a message according to the goods preparation message on the TV screen.

Furthermore, the payment server 52 calculates the goods purchase charge by reading the contents of goods preparation recorded in the transaction, and informs the transmission system 3. The transmission system 3 informs the credit payment system 30 of the charge that is obtained by adding a TV view/listening charge to this goods purchase charge. Receiving this, the credit payment system 30 demands the total charge of these goods purchase charge and TV watching charge of the viewers. The viewer pays the goods purchase charge and TV view/listening charge to the credit payment system 30. The credit payment system 30 pays the goods purchase charge and TV view/listening charge, which are paid, to the transmission system 3. The transmission system 3 pays the goods purchase charge to the selling system 27 after recovering only the TV view/listening charge from this. The selling system 27 recovers the goods purchase charge, and sends out the goods to the viewers.

According to the above configuration, the order information and confirmation request message, which are transmitted from the transmission system 3 to the IRD 51 through the communication satellite 2, can be encrypted in order to be decoded only by a specific IC card 16. Further, order information and confirmation request message, which are transmitted from IRD 51 to the payment server 52 through telephone network 20 can be encrypted in order to be decoded only by an IC card number of a specific IC card 16. Thereby, hacking by performing masquerade and tapping through authenticating a viewer can be prevented from with identifying the viewer with using an existing IC card 16. Hence, the safety of communication can be secured with such a simple configuration.

(3) Other Embodiments

Note that, in the above-described first and second embodiments, the inventory confirmation block 24 confirming the inventory of the goods to be ordered is provided in the payment server 22 or 52. However, the present invention is not limited to this, and the payment server can be constructed without the inventory confirmation block 24.

Furthermore, in the above-described first and second embodiments, the EMM message S21 is transmitted to the IRD 9 or 51 through the transponders of the communication satellite 2. However, the present invention is not limited to this, and information that is obtained by encrypting the order ID number, order information, and confirmation request message can be transmitted through a ground network such as the telephone network 20.

Moreover, in the above-described first and second embodiments, the present invention is applied to the digital satellite broadcasting system 1 or 50 providing a shopping service program. However, the present invention is not limited to this, and the present invention can be widely applied to television broadcasting apparatuses providing interactive broadcasting-service.

In addition, in the above-described first and second embodiments, the present invention is applied to the transmission system 3 and payment server 22 or 52. However, the present invention is not limited to this, and in brief, the present invention can be applied to information centers, where encrypting confirmation information is processed based on predetermined response information, which is transmitted from an information terminal, with an encryption method inherent to the information terminal which transmits the response information, to the information terminal.

Furthermore, in the above-described first and second embodiments, the present invention is applied to the IRD 9 or 51. However, the present invention is not limited to this, and in brief, the present invention can be applied to information terminals each of which deciphers received confirmation information, and judges whether the information coincides with the contents of response information.

In this manner, according to the present invention, when an information center transmits the contents of a response signal transmitted from an information terminal, as confirmation information, to the information terminal, the confirmation information is encrypted with a certain method that can be deciphered only by the information terminal. Thereby, the safety of information transmission between the information center and information terminal can be secured.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An information broadcasting method for an information center executing service processing according to predetermined response information by transmitting, from an information terminal to said information center, said response information according to a program transmitted from said information center to said information terminal, said information broadcasting method comprising:

encrypting, by said information center, confirmation information based on said response information using an inherent encryption method that corresponds to said information terminal, and transmitting said confirmation information to said information terminal;

deciphering, by said information terminal which receives said confirmation information, said confirmation information;

transmitting, from said information terminal to said information center, second response information corresponding to said confirmation information; and encrypting, by said information center, second confirmation information that corresponds to said second response information using an inherent encryption method corresponding to said information terminal that transmitted said response information, and transmitting said second confirmation information to said information terminal.

2. The information broadcasting method according to claim 1, wherein said response information includes identification information for identifying said information terminal.

3. The information broadcasting method according to claim 2, wherein said information terminal has a detachable integrated circuit (IC) card, said identification information being an IC card number stored in said IC card.

4. The information broadcasting method according to claim 1, wherein said information terminal encrypts said response information using an inherent encryption method corresponding to said information terminal, and transmits said encrypted response information to said information center; and said information center deciphers said encrypted response information using an inherent deciphering method corresponding to said information terminal.

5. The information broadcasting method according to claim 4, wherein said information terminal has a detachable integrated circuit (IC) card and encrypts said response information using identification information stored in said IC card.

6. The information broadcasting method according to claim 5, wherein said response information includes a user ID and a password, and said information terminal encrypts said response information using an IC card number stored in said IC card.

7. The information broadcasting method according to claim 6, wherein said user ID and said password are issued by said information center prior to said information terminal accepting a service, and said user ID and said password are stored in said information terminal.

8. The information broadcasting method according to claim 1, wherein said information center multiplexes said confirmation information within broadcast signals to produce a resultant signal and transmits said resultant signal to said information terminal; and said information terminal transmits said response information to said information center via a public telephone network.

9. The information broadcasting method according to claim 8, wherein said information terminal transmits said second response information to said information center via said public telephone network; and said information center multiplexes second confirmation information corresponding to said second response information within broadcast signals and transmits said resultant signal to said information terminal.

10. An information broadcasting method for an information center executing service processing according to predetermined response information by transmitting, from an information terminal to said information center, said response information according to a program which is transmitted from said information center to said information terminal, said method comprising:

transmitting, from said information terminal to said information center, said response information via a public telephone network;

encrypting, by said information center, confirmation information based on said response information using an inherent encryption method corresponding to said information terminal, multiplexing said confirmation information within broadcast signals to produce a resultant signal, and transmitting said resultant signal to said information terminal;

deciphering, by said information terminal which receives said confirmation information, said confirmation information and transmitting second response information corresponding to said confirmation information to said information center via said public telephone network; and multiplexing within broadcast signals, by said information center, second confirmation information corresponding to said second response information to produce a multiplexed signal and transmitting said multiplexed signal to said information terminal.

11. The information broadcasting method according to claim 10, wherein said response information includes identification information for identifying said information terminal.

12. The information broadcasting method according to claim 11, wherein said information terminal has a detachable integrated circuit (IC) card, said identification information being an IC card number stored in said IC card.

13. The information broadcasting method according to claim 10, wherein said information terminal transmits, to said information center, second response information corresponding to said confirmation information; and said information center encrypts second confirmation information corresponding to said second response information using an inherent encryption method corresponding to said information terminal, and said information center transmits said second confirmation information to said information terminal.

14. The information broadcasting method according to claim 10, wherein said information terminal encrypts said response information using an inherent encryption method corresponding to said information terminal, and transmits said encrypted response information to said information center; and said information center deciphers said response information using an inherent deciphering method corresponding to said information terminal.

15. The information broadcasting method according to claim 14, wherein said information terminal has a detachable integrated circuit (IC) card and encrypts said response information using identification information stored in said IC card.

16. The information broadcasting method according to claim 15, wherein said response information includes a user ID and a password, and said information terminal encrypts said response information using an IC card number stored in said IC card.

17. The information broadcasting method according to claim 16, wherein said user ID and said password are issued by said information center prior to said information terminal accepting a service in said information terminal, and said user ID and said password are stored in said information terminal.

18. In a mutual direction service system, a receiver for executing mutual direction service processing that corresponds to response information of a broadcast station by transmitting, from said receiver to said broadcast station, predetermined response information corresponding to a mutual service program transmitted from said broadcast station, said receiver comprising:

receiving means for receiving, from said broadcast station, encrypted confirmation information that corresponds to said response information;

detachable storing means for storing receiver identification information;

deciphering means for deciphering codes of said received confirmation information using said receiver identification information stored in said storing means; and transmitting means for transmitting second response information that corresponds to said deciphered confirmation information;

said receiving means receiving encrypted second confirmation information transmitted by said broadcast station; and said deciphering means deciphering codes of said second confirmation information.

19. The receiver according to claim 18, wherein said transmitting means transmits said response information that corresponds to said mutual service program after including said receiver identification information.

20. The receiver according to claim 18, wherein said receiving means separates said confirmation information from multiplexed broadcast signals.

21. The receiver according to claim 18, wherein said transmitting means transmits said response information to said broadcast station via a public telephone network.

22. The receiver according to claim 18, further comprising:

encryption means for encrypting said response information using said receiver identification information, wherein said transmitting means transmits encrypted response information to said broadcast station.

23. In a broadcast station, an information processing apparatus for receiving, from a receiver, predetermined response information that corresponds to a mutual direction service program and for executing mutual direction service processing that corresponds to said received response information, said information processing apparatus comprising:

storing means for storing encryption information that corresponds to receiver identification information of a plurality of receivers;

reading means for reading out, from said storing means, said encryption information that corresponds to receiver identification information contained in said received response information;

encrypting means for encrypting confirmation information based on said read out encryption information; and transmitting means for transmitting, to said receiver which transmitted said response information, said encrypted confirmation information;

said transmitting means multiplexing said confirmation information within broadcast signals to produce a resultant signal and transmitting said resultant signal;

said transmitting means repeatedly transmitting said confirmation information.

24. The information processing apparatus according to claim 23, wherein information contained in said response information, other than said receiver identification information, is received in encrypted form from said receiver; said information processing apparatus further comprising deciphering means for deciphering codes encrypted on said response information using said receiver identification information contained in said response information.

* * * * *

UNITED STATES PATENT AND TRADEMARK OFFICE
CERTIFICATE OF CORRECTION

PATENT NO. : 6,427,013 B1
DATED : July 30, 2002
INVENTOR(S) : Kiyoshi Shimizu

It is certified that error appears in the above-identified patent and that said Letters Patent is hereby corrected as shown below:

Column 4,
Line 22, "514" should read -- S14 --.
Line 26, "515" should read -- S15 --.
Line 41, "919" should read -- S18 --.

Column 6,
Line 9, "B28" should read -- S28 --.

Column 10,
Line 28, after "S60", insert a -- , --.

Signed and Sealed this

Seventh Day of January, 2003

JAMES E. ROGAN
*Director of the United States Patent and Trademark Office*